S. ETTER.
CHURN.
APPLICATION FILED MAR. 9, 1909.
932,455.
Patented Aug. 31, 1909.
2 SHEETS—SHEET 1.
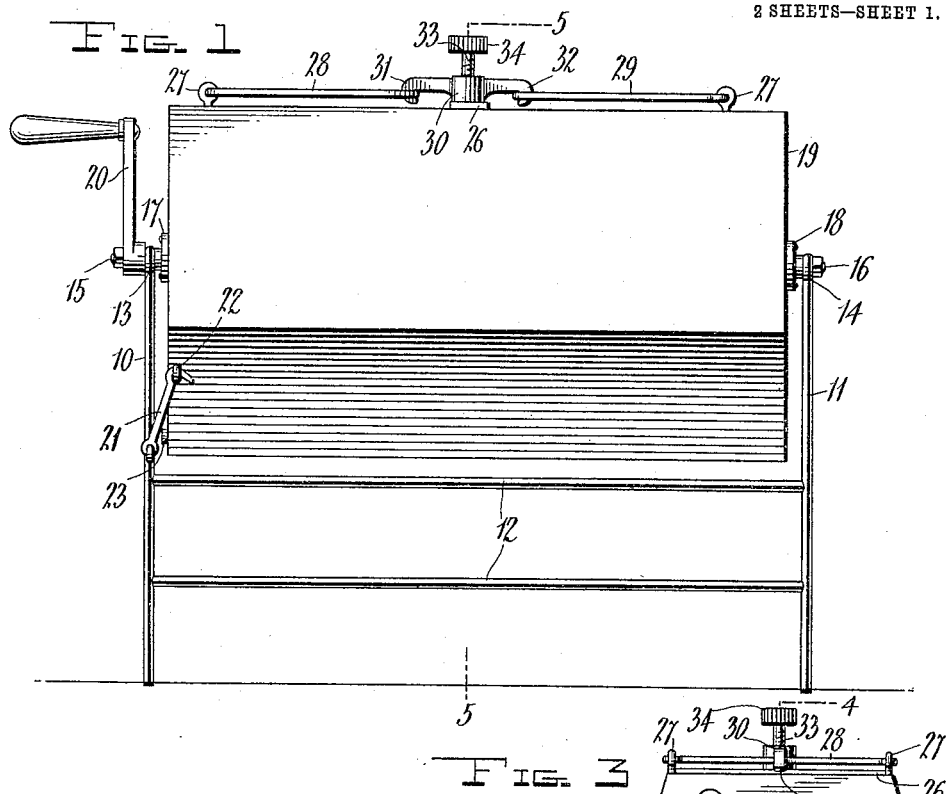
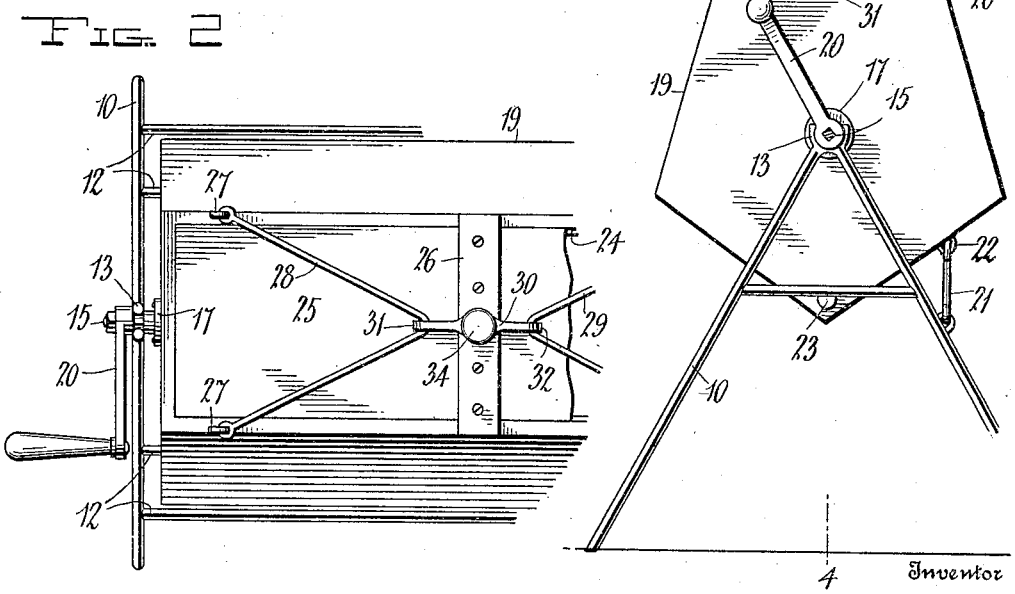
Witnesses
Inventor
Samuel Etter
By
Attorneys S. ETTER.
CHURN.
APPLICATION FILED MAR. 9, 1909.
932,455.
Patented Aug. 31, 1909.
2 SHEETS—SHEET 2.
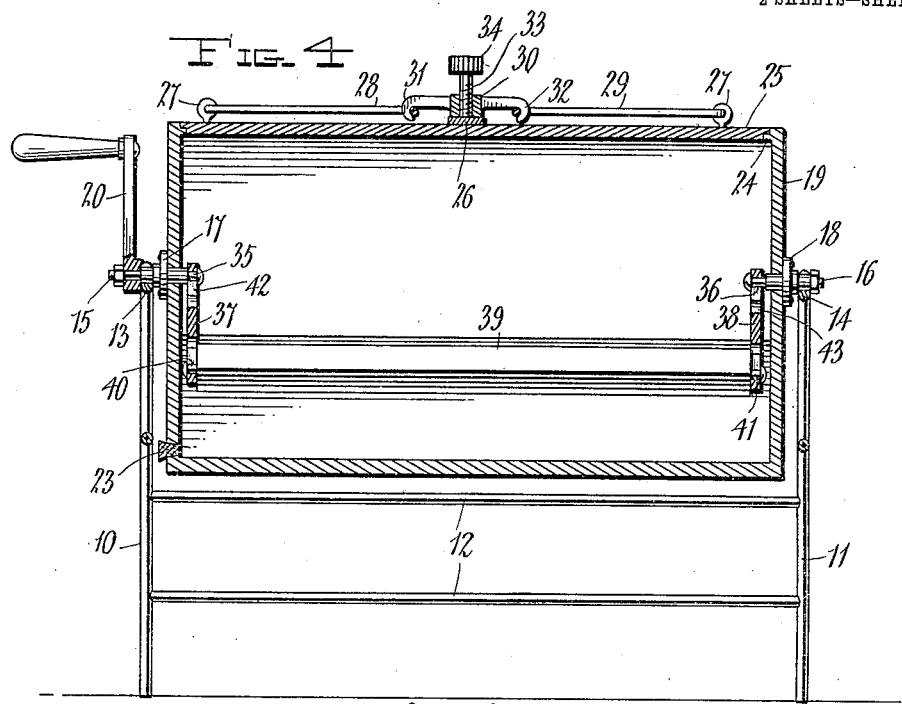
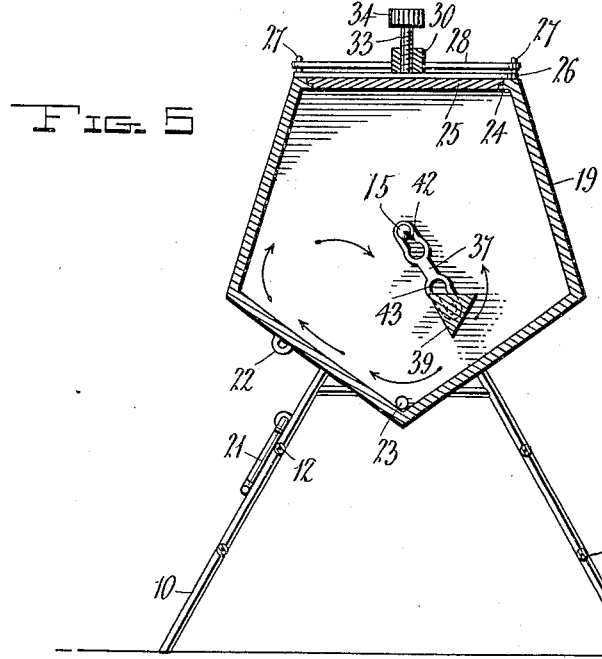
Witnesses
Inventor
Samuel Etter
By
Attorneys

UNITED STATES PATENT OFFICE.

SAMUEL ETTER, OF LA FAYETTE, INDIANA.

CHURN.

932,455.    Specification of Letters Patent.    Patented Aug. 31, 909.

Application filed March 9, 1909. Serial No. 482,283.

*To all whom it may concern:*

Be it known that I, SAMUEL ETTER, a citizen of the United States, residing at La Fayette, in the county of Tippecanoe, State of Indiana, have invented certain new and useful Improvements in Churns; and I do hereby declare the following to be a full, clear, and exact description of the invention, such as will enable others skilled in the art to which it appertains to make and use the same.

This invention relates to churns, and has for one of its objects to improve and simplify the construction and increase the efficiency and utility of devices of this character.

With this and other objects in view, the invention consists in certain novel features of construction as hereafter shown and described and then specifically pointed out in the claim, and in the drawings illustrative of the preferred embodiment of the invention, Figure 1 is a side elevation of the improved churn. Fig. 2 is a plan view of a portion of Fig. 1. Fig. 3 is an end elevation. Fig. 4 is a section on the line 4—4 of Fig. 3. Fig. 5 is a section on the line 5—5 of Fig. 1.

The improved churn comprises a supporting frame formed with spaced end members 10—11 and connecting members 12. The supporting frame may be constructed of any suitable material, of any suitable size, but for the purpose of illustration is shown formed of rods suitably connected. The end members 10—11 of the frame are provided respectively with bearings 13—14 at their upper ends to receive stub shaft 15—16, the stub shafts extending inwardly and provided with bearing plates 17—18 spaced from the inner ends.

The receptacle for the cream is represented as a whole at 19, and preferably formed with a plurality of flat sides, five of the flat sides being shown. The stub shafts 15—16 extend through the ends of the receptacle and the plates 17—18 bear against the outer faces of the said ends and are secured therethrough by screws or other fastening devices. By this means the receptacle is mounted for rotation upon the supporting frame. One of the stub shafts is provided with an operating crank 20.

The supporting frame member 10 is provided with a hook 21 adapted to be engaged with a staple 22 upon the receptacle 19, to enable the receptacle to be locked in position when the contents are to be deposited or removed. A draw-off plug 23 is also arranged in the receptacle 19 as shown.

One of the flat sides of the receptacle is formed with a relatively large aperture surrounded by a bearing flange 24, and resting upon this bearing flange is a detachable closure 25. The closure is provided centrally with a transverse strengthening plate 26 extended at its ends to bear upon the upper faces of the supporting flange 24.

Rising from the flange 24 at four points are eyes 27, the eyes being arranged in opposite pairs near the ends of the receptacle. Swinging upon one of the pairs of eyes is a V shaped bail 28 and likewise swinging from the other opposite pair of the eyes is a similar V shaped bail 29, the apexes of the bails being spaced apart near the plate 26 when arranged in parallel position with the longitudinal plane of the receptacle.

Located above the receptacle 19 is an arm 30 having hooks 31—32 at its ends engaging with the pointed central portions of the bails 28—29, the arm having a central threaded aperture through which a threaded clamp screw 33 operates, the clamp screw having a milled head 34 to facilitate its operation. The inner end of the screw 33 bears upon the plate 26. By this arrangement it will be obvious that when the screw 33 is operated in one direction pressure will be applied to the closure 25 to hold it firmly in position during the churning action, and then when the contents are to be removed the receptacle is located with the closure side uppermost and the hook 21 engaged with the staples 22 to hold the receptacle stationary. The clamp device is then released and the closure removed. The inner ends of the stub shafts 15—16 are provided with annular recesses 35—36, and hanging loosely upon these stub shafts are bars 37—38. Extending between the bars 37—38 is an agitator member 39, the latter having trunnions 40—41 mounted for rotation in the free ends of the bars 37—38 and provided with enlarged terminals. The bars 37—38 are provided with longitudinal slots 42—43 near their ends, the slots 42 being enlarged at their inner ends to receive the terminals of the stub shafts 15—16 while the smaller outer portions of the slots receive the annular contracted portions 35—36. By this means the arms 37—38 may be readily coupled to and uncoupled from the stub shafts. The inner ends of the slots 43 are enlarged to receive the larger terminals of the trunnions 40—41, while the smaller portions of the slots fit over the reduced portion of the terminals. By this means the agitator member 39 can be readily coupled to and uncoupled from the bars 37—38. The agitator member 38 hangs loosely within the receptacle 19, and is not affected by the rotation of the receptacle. The member 39 hanging loosely within the receptacle, the rotation of the receptacle produces an agitation between the cream and the loosely hanging member, thereby materially increasing the effectiveness of the device without increasing the work of the operator, as the presence of the member 39 does not increase the force required to rotate the receptacle. The member 39 rotating freely upon its pivots, the friction of the cream causes it to rotate to a certain extent, and this action of the triangular member increases the agitation of the cream and produces a somewhat rotative movement therein as illustrated by the arrows in Fig. 5. The member 39 is therefore an important feature of the invention and adds materially to its efficiency and utility.

What is claimed, is:—

In a churn, a supporting frame, a receptacle, stub shafts mounted for rotation upon said frame and extending through the ends of said receptacle and with enlarged inner terminals, an agitator member having studs at the ends with enlarged outer terminals, and arms having longitudinal slots at the ends with the inner ends of the slots enlarged, said enlarged slot terminals engaging over the enlarged terminals of the stub shaft and the agitator studs with the bodies of the shafts and studs bearing in the smaller portions of the slots.

In testimony whereof, I affix my signature, in presence of two witnesses.

SAMUEL ETTER.

Witnesses:
   MICHAEL G. RICKS,
   GEO. W. KIRKPATRICK.